UNITED STATES PATENT OFFICE.

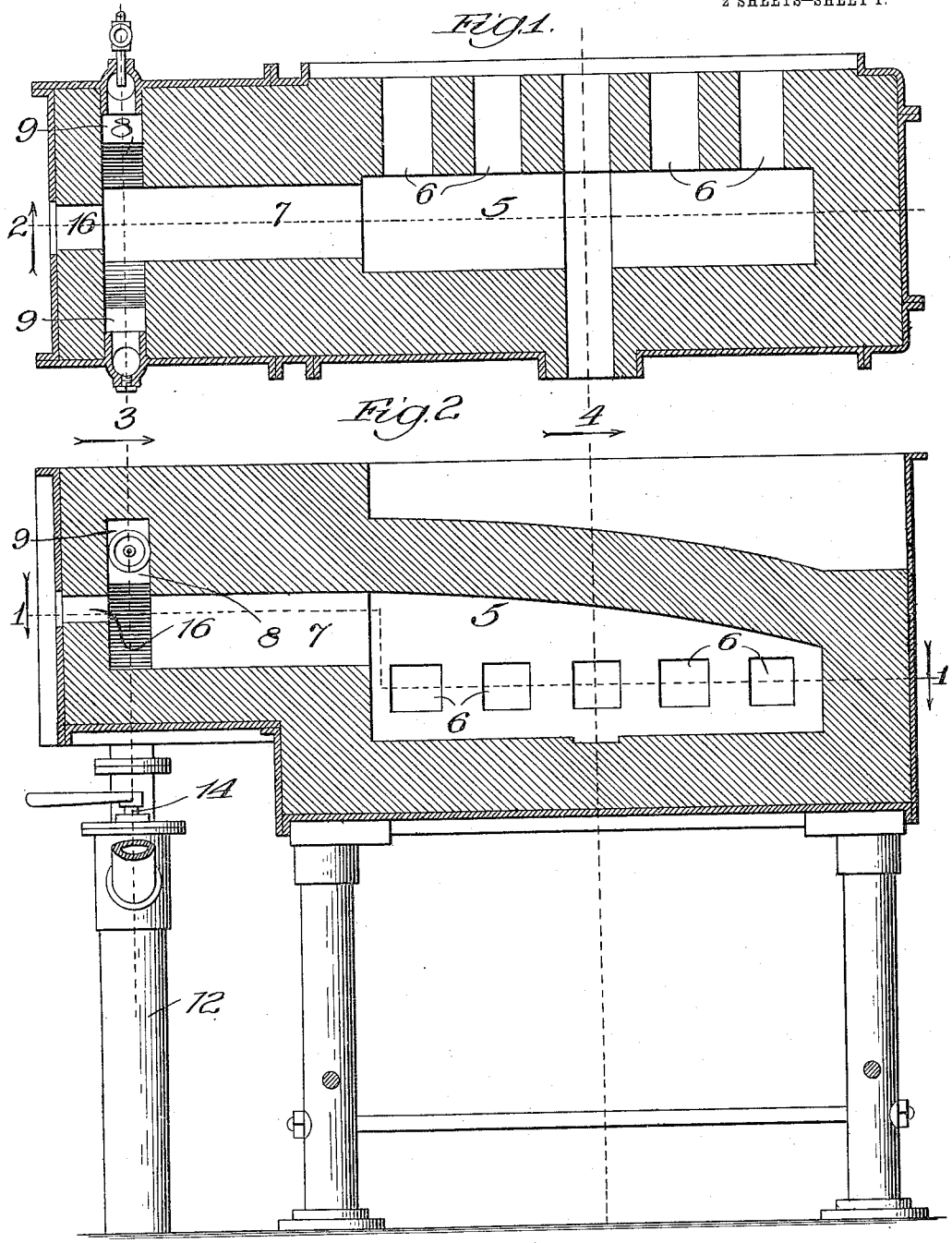

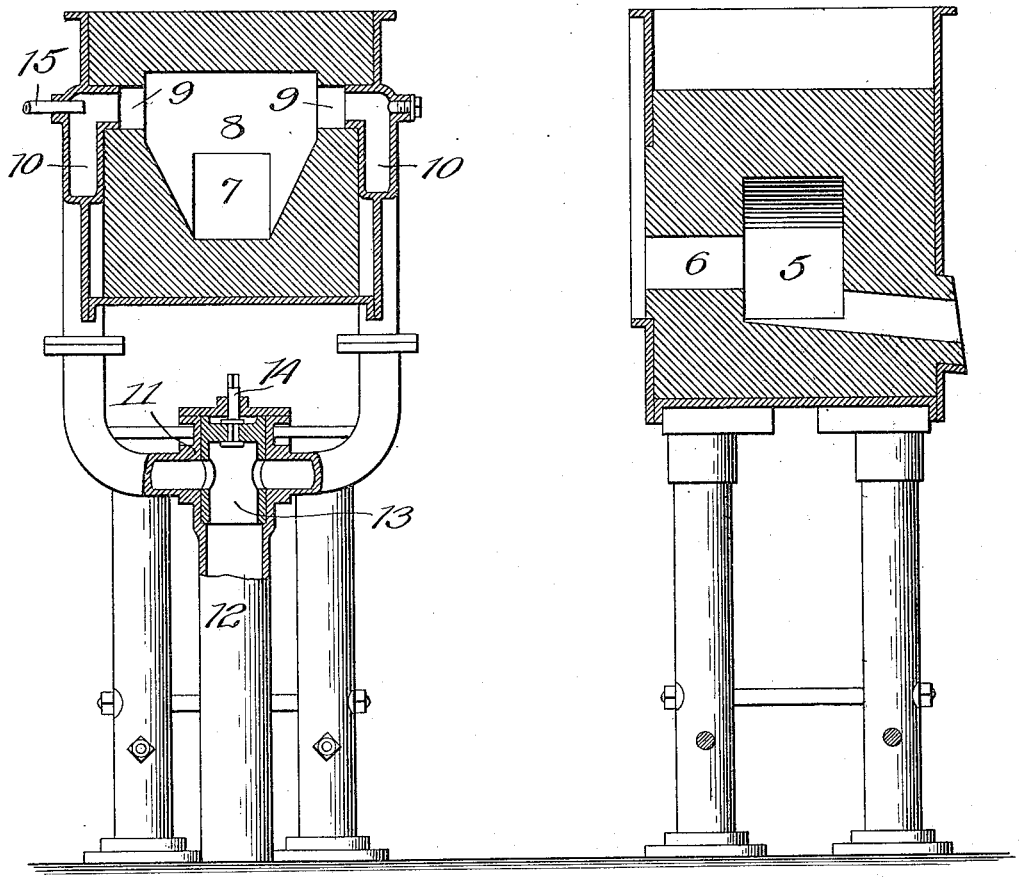

WALDO G. LUNGER, OF CHICAGO, ILLINOIS, ASSIGNOR TO AMERICAN SHOP EQUIPMENT CO., OF CHICAGO, ILLINOIS, A CORPORATION OF MAINE.

FURNACE.

1,130,306.            Specification of Letters Patent.            Patented Mar. 2, 1915.

Application filed December 8, 1913. Serial No. 805,269.

*To all whom it may concern:*

Be it known that I, WALDO G. LUNGER, a citizen of the United States, residing at Chicago, in the county of Cook and State of Illinois, have invented a new and useful Improvement in Furnaces, of which the following is a specification.

My invention relates to improvements in furnaces employing oil as fuel, such as crude petroleum or any other suitable fuel oil.

It is highly desirable in furnaces, especially where metallic bodies are subjected to heat therein, that provision be made for the perfect combustion of the fuel before it reaches the heating chamber, so that heated gases only, as distinguished from gases containing uncombined carbon or oxygen, enter the heating chamber.

My object is to provide a novel, simple, economical and serviceable construction of furnace which will operate in the manner above described, and by which the full benefit of the heat units in the fuel may be obtained.

Referring to the accompanying drawings—Figure 1 is a view in horizontal plan section of a furnace constructed in accordance with my invention, designed for heating metallic bodies therein, the section being taken at the line 1 on Fig. 2 and viewed in the direction of the arrow. Fig. 2 is a section taken at the line 2 on Fig. 1 and viewed in the direction of the arrow; and Figs. 3 and 4, sections taken at the lines 3 and 4, respectively, on Fig. 2 and viewed in the direction of the arrows.

In constructing a furnace in accordance with the preferred embodiment of my invention, where metallic bodies are to be subjected to heat, I provide a heating chamber, represented at 5, into which the articles to be treated by the heat are introduced as through the openings 6 in a side wall of this chamber. Opening into the heating chamber 5 is a chamber 7 which communicates at its opposite end with a chamber 8 which extends at its upper end above the chamber 7, the upper end of the chamber 8 being preferably wider than the chamber 7, as represented particularly in Fig. 3, with its side walls converging downwardly to cause the chamber 8 at its lower end to merge into the chamber 7. The furnace is formed of refractory material, such as fire brick, suitably positioned to present the chambers hereinbefore described.

Opening into the chamber 8 at opposite sides thereof near its upper end, and preferably above the chamber 7 are passages 9, pipes 10, which communicate with an air supply, opening into the passages 9, as represented in Fig. 3. The pipes 10 in the construction illustrated open at their opposite ends into a valve casing 11 which is in communication with a pipe 12, which, in practice, would connect with an air-blast, a valve 13 having an operating stem 14 being provided in the casing 11 controlling the supply of air to the pipes 10. The valve 13, which may be of any suitable construction, operates to cause equal quantities of air to pass from the pipe 12 into the pipes 10, so that the air passed into the furnace from the pipe 12, through the pipes 10, will enter the chamber 8 at opposite sides thereof in substantially equal proportions.

The fuel oil is introduced into the chamber 8 through either one or both of the passages 9. In the construction illustrated, provision is made for introducing oil into the furnace through one only of the passages 9, and to this end a pipe 15, adapted to be connected with a source of supply of any suitable fuel-oil, and preferably having a needle-valve-controlled discharge-orifice, projects into one of the pipes 10 in line with one of the passages 9, it being preferred that the supply of oil with which the pipe 15 is connected be under a pressure sufficient to feed the oil in the proper amounts as conditions require.

It is the aim, in carrying out my invention in the preferred manner, to cause the pressure entering the chamber 8 through the passages 9, to be substantially equal in these passages, which will cause the opposing streams of fluid pressure to directly impinge against each other at a point substantially midway between the side-walls of the chamber 8.

The operation of the furnace is as follows: Assuming the valve 13 is open, air will enter the chamber 8 at opposite sides thereof and in its upper portion, through the passages 9, the air entering the chamber 8 at one side thereof atomizing the oil from the pipe 15 and becoming mixed therewith. The oil is ignited for lighting the burner in any suitable manner as by introducing burning waste into the chamber 8 through an opening 16 in the end of the furnace which may be closed by a fire brick, or any other suitable means (not shown) after the burner has been lighted.

The effect of opposing burning streams of oil and air mixed therewith, or a burning stream of oil and air, and a stream of air only, and causing these directly-opposed streams to impinge against each other, is to not only thoroughly mix the oil and air, but also to hold the oil at the point of impingement of the opposed streams, momentarily in suspension, which produces a more or less thorough intermixture of the oil and air and volatilization of the oil, the combustion which takes place in the chamber 8 being what may be termed primary combustion, and I have therefore chosen to designate this chamber as the primary combustion chamber. The burning gases then pass into the chamber 7, wherein complete combustion takes place, the heated gases then passing into the heating chamber 5 for heating the metallic objects introduced therein. It is highly desirable that structures of this character be compact, and one of the particular aims of my invention is to reduce the dimensions of a furnace as much as possible without sacrificing efficiency. This I have been able to do by providing for the introduction into a chamber exterior of the heating chamber, streams of air which directly oppose each other, either one or both of which is mixed with oil, which so mix the oil and air and retard the progress of the mixture through the chamber 8 by changing the direction of motion thereof in this chamber, that a relatively short chamber 7 need be provided to insure against the introduction into the heating chamber of the oil in a liquid state or uncombined carbon or oxygen, and thus a furnace constructed in accordance with my invention may be economically manufactured and be of exceedingly compact form. Furthermore, the pressure of the burning gases after impingement in the chamber 8 as stated, is so reduced, when the furnace is operated in the preferred manner, as to cause practically no pressure thereof, except that produced by the gases in expanding, to exist in the chamber 7. Thus the heating chamber will be substantially filled with heated gases under such low pressure that danger or inconvenience to the workmen operating at the openings in the furnace is reduced to the minimum.

While I have shown and described my invention as applied to a furnace for subjecting metallic bodies to heat, I do not wish to be understood as intending to limit it to its use in this connection, as it may be employed in many other kinds of furnaces without departing from the spirit of my invention. Furthermore I do not wish to be understood as intending to limit it to the particular form of construction shown, as the same may be variously modified and altered without departing from the spirit of my invention, it being my intention to claim my invention as fully and broadly as the prior state of the art will permit.

What I claim as new and desire to secure by Letters Patent is:

1. A furnace comprising a heating chamber, a second, oil-vaporizing, chamber communicating with said heating chamber, a preliminary, oil-vaporizing, combustion chamber opening into said second chamber, means for introducing streams of air into said preliminary combustion chamber from opposite sides thereof for the impingement of said streams against each other, and means for introducing oil into one or both of said streams of air.

2. A furnace comprising a heating chamber, a second, oil-vaporizing, chamber communicating therewith, a preliminary, oil-vaporizing, combustion chamber communicating with said second chamber and extending above the latter, means for introducing streams of air into said preliminary combustion chamber at opposite sides thereof and in the upper portion of said chamber for impingement of said streams of air against each other, and means for introducing oil into one or both of said streams of air.

3. A furnace comprising a heating chamber, an oil-vaporizing chamber external of said heating chamber and in communication at one end therewith and with its opposite end of enlarged dimensions, forming a preliminary oil-vaporizing space, means for introducing streams of air into said second chamber at its enlarged end from opposite sides thereof for the impingement of said streams against each other, and means for introducing oil into one or both of said streams of air.

4. A furnace comprising a heating chamber, an oil-vaporizing chamber external of said heating chamber and in communication at one end therewith and having at its opposite end an oil-vaporizing space, means for introducing streams of air into said second chamber from opposite sides thereof for the impingement of said streams against each other, and means for introducing oil into one or both of said streams of air.

WALDO G. LUNGER.

In presence of—
A. J. FLOYD,
L. HEISLAR.